ated Feb. 12, 1918.

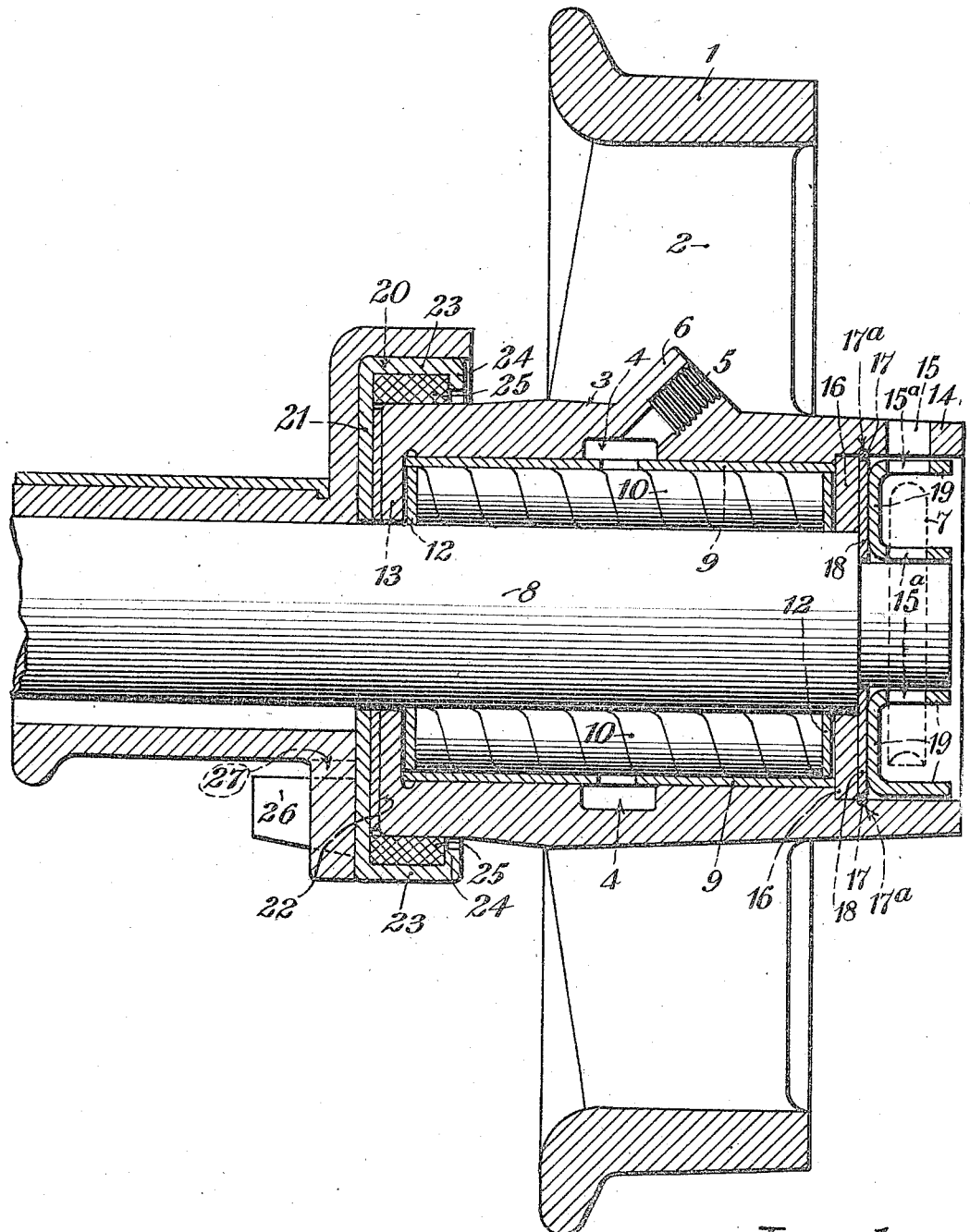

UNITED STATES PATENT OFFICE.

JOHN LEE McDOWELL, OF BERWICK, PENNSYLVANIA, ASSIGNOR TO AMERICAN CAR AND FOUNDRY COMPANY, OF NEW YORK, N. Y., A CORPORATION OF NEW JERSEY.

LUBRICATED MINE-CAR WHEEL.

1,256,151.

Specification of Letters Patent.

Patented Feb. 12, 1918.

Application filed September 5, 1917. Serial No. 189,863.

*To all whom it may concern:*

Be it known that I, JOHN LEE McDOWELL, residing at Berwick, Columbia county, State of Pennsylvania, and being a citizen of the United States, have invented certain new and useful Improvements in Lubricated Mine-Car Wheels, of which the following is a full, clear, and exact description, such as will enable others skilled in the art to which it appertains to make and to use the same, reference being had to the accompanying drawing, which illustrates the preferred form of the invention, though it is to be understood that the invention is not limited to the exact details of construction shown and described, as it is obvious that various modifications thereof within the scope of the claims will occur to persons skilled in the art.

In said drawing: the single figure illustrates my improved car wheel in vertical section, showing its relation with its associated journal box.

This invention relates to improvements in roller bearing mine car wheels and consists in certain features of novelty as hereinafter more fully described and particularly pointed out in the claims.

Referring to the parts, 1 indicates the tread, 2 the spokes and 3 the hub of my improved wheel, which latter is provided with an annular lubricant chamber 4, access to which is obtained through the port 5 in the stud 6 which extends radially from the hub, which port 5 is internally screw-threaded, as shown, to permit temporary attachment thereto of a grease gun or other convenient means for forcing grease into the lubricant reservoir 4, after which the grease gun may be removed.

The wheel is what is known as the open-end type of wheel in which the outer end is not closed by an end lubricant-retaining wall cast integral with the hub, and the cotter pin, which secures the wheel to the axle 8, is at all times exposed to view.

Within the roller bearing chamber of the wheel is a sleeve or bushing 9 of suitable metal adapted to serve as a wearing face for the rollers 10, which latter are of maximum diameter throughout their length and are loosely mounted on studs (not shown) integral with the annuli 12, which latter rotate with the rollers freely independently of the wheel, while the rollers 10 rotate independently of the annuli 12 and the wheel hub. The sleeve 9 is perforated at convenient intervals to permit the passage of lubricant from the lubricant reservoir 4 to the rollers 10.

The inner end of the hub is closed, as shown, by the wall 13 formed integral with the hub 3 and the hub extends outwardly beyond the roller bearing assembly, as noted, to provide a dust cap 14 surrounding the outer end of the axle, which dust cap is perforated at 15 to permit insertion of the cotter pin 7. The sleeve 9 extends from the rear wall 13, with which it is preferably in contact, outwardly beyond the outer annulus 12 and preferably into contact with the washer 16 which retains the roller bearing assembly and the sleeve 9 in position within the wheel hub. Preferably the washer 16 is held in position by means of a split ring 17 which is seated in an annular groove 17$^a$ outside of and immediately adjacent the washer 16, the ring 17 being of sufficient size and seated in a sufficiently deep groove to serve as a relatively permanent locking means to retain the washer 16 and the roller bearing assembly within the wheel hub, though the washer is split so that in case of an emergency the roller bearing assembly may be removed as, for example, when the tread 1 of the wheel is worn flat and it is desired to use the roller bearing assembly in a new wheel.

In approximate alinement with the ring 17 and next adjacent the washer 16, is a loose washer 18, and outside of this, that is nearer the outer end of the axle, is another washer 19 through which the cotter pin 7 passes so as to cause the washer 19 to rotate, if at all, only with the axle 8—that is, to permit the wheel to rotate independently of the washer 19—and the washer 18 is interposed between washers 16 and 19 to reduce the friction which might otherwise ensue.

Upon and inclosing the rear end of the hub is a lubricant-retaining cap 20 comprising the web 21 which provides a wear face or washer intermediate the rear face 22 of the wheel hub, or the next adjacent member of the assembly and the journal box. This cap 20 may rotate with the wheel, if desired, and is provided with an outer flange 23, which extends longitudinally parallel with the axle 8, and an inturned flange 24 at right angles thereto, which, with the web 21, serves as retaining means to hold in position the packing 25 of hair felt or other suitable material to prevent loss of lubricant, and incidentally to retain a film of lubricant between the rear face 22 of the wheel hub and the next adjacent face of the web 21, or between the faces of an interposed washer, when one is used, and the rear hub face 22 and said adjacent face of web 21.

If desired, the cap 20 may be provided with a lug 26 extending rearwardly therefrom, which lug is adapted to interlock with a convenient opening in an adjacent journal box 27 to prevent rotation of the cap.

In assembling the wheel after the hub has been properly bored, the sleeve 9 is inserted, then the elements of the roller bearing assembly comprising the rollers 10 and an annuli 12 are positioned, after which the washer 16 is inserted and the split ring 17 is placed in position to retain said washer 16 in relatively permanent position within the hub. The washer 18 is next applied, then the washer 19, and the cotter pin 7 is projected through the opening 15 in the cap 14 and the coincident openings 15a, through the outstanding flange of washer 19 and the axle 8, and, due to the peculiar shape of the washer 19, which is in the form of an annulus having a U-shaped cross section, a film of lubricant is retained between the inner face of said washer 19 and the next adjacent member of the wheel assembly and between the outstanding flange of washer 19 and the dust cap 14.

What I claim is:

1. In combination, a car wheel having a hub with an enlarged axle bore, lubricated friction-reducing means therein, said hub extending outwardly beyond said means to form an annular dust cap, an axle projecting through and beyond the outer end of said means, a washer and a removable ring retaining said means in position, and a lubricant-retaining washer secured on said axle and having flanges closely paralleling said dust cap and axle to retain a film of lubricant between them and itself.

2. In combination, a car wheel having a hub with an enlarged axle bore and formed with an annular dust cap at its outer end, lubricated friction-reducing means in said bore, an axle surrounded thereby, and washers, one being removably secured to said hub to retain said means and another being affixed to said axle and comprising annular flanges paralleling said axle and dust cap to retain lubricant film and a web portion in proximity to a next adjacent washer to also retain lubricant film.

3. In combination, a car wheel having a hub with an axle bore and an annular dust cap at its outer end, lubricated friction-reducing means in said bore, an axle surrounded thereby, a washer and a split ring co-acting with said hub to retain said means, a lubricant-film-retaining washer secured to said axle, a friction-reducing washer interposed between the first two mentioned washers, said film-retaining washer having flanges and a web in close parallelism with said axle dust cap and said interposed washer.

4. In combination, a car wheel hub having an enlarged axle bore and an annular dust cap at its outer end, a bushing in said bore, an axle with a reduced outer end, lubricated friction-reducing means intermediate said axle and bushing, a washer on the larger portion of said axle, a split ring coacting with the same and the hub to lock said bushing and means in said hub, a lubricant-film-retaining washer secured to said axle, a friction-reducing washer between the first mentioned and film-retaining washers, said film-retaining washer being sufficiently close to said axle, dust cap and friction-reducing washer to retain a lubricant film between itself and them.

5. In combination, a car wheel hub provided with an enlarged bore and a dust cap extension, an axle shouldered near its outer end, lubricated friction-reducing means in said bore, a washer and a split ring retaining the same in position in said hub, a lubricant-film-retaining washer secured on the outer end of said axle closely paralleling said axle and dust cap, and a friction-reducing washer loosely mounted on said axle outside its shoulder intermediate the first mentioned and film-retaining washers in close proximity thereto.

6. In combination, a car wheel hub having an enlarged bore and an annular dust cap extension, lubricated friction-reducing means in said bore, a shouldered axle with a reduced outer end, a removable washer and split ring seated in the hub retaining said means in position, a lubricant-film-retaining washer secured to said axle extending longitudinally of and in close relation to said axle and dust cap, and a friction-reducing washer loose on the reduced axle end outside the axle shoulder and in alinement with said split ring.

7. In combination, a car wheel with a hub having an enlarged axle bore and a perforated dust cap extension at its outer end, lubricated friction-reducing means in said bore, a washer removably held in said hub retaining said means in position therein, an axle, a lubricant-film-retaining washer outside the first mentioned washer having perforated flanges closely paralleling said axle and dust cap, and a wheel-attaching pin insertible through said dust cap and film-retaining washer locking the latter to said axle.

8. In combination, a car wheel with a hub having an enlarged bore, lubricated friction-reducing means therein, a removably held washer retaining said means in position in said hub, an axle, and a washer in the form of a U-shaped annulus outside the first mentioned washer and held in position between said axle and the annular wall of the hub.

9. In combination, a car wheel with a hub having an inner end wall and an open outer end and provided with an enlarged bore, lubricated friction-reducing means in said bore, a removably held washer retaining the same therein, a journal box adjacent the hub inner end, an axle extending through said journal box and friction-reducing means and beyond said washer, another washer in the form of a U-shaped annulus encircling and secured to said axle outside the first mentioned washer within the hub bore.

10. In combination, a car wheel with a hub having an inner end wall and an open outer end and provided with an enlarged bore, lubricated friction-reducing means in said bore, a removably held washer retaining the same therein, a journal box adjacent the hub inner end, lubricant-retaining means between said journal box and inner hub end, an axle extending through said journal box and friction-reducing means and beyond said washer, another washer in the form of a U-shaped annulus encircling and secured to said axle outside the first mentioned washer within the hub bore.

In witness whereof I have hereunto set my hand in the presence of two witnesses.

JOHN LEE McDOWELL.

Witnesses:
MARY E. BRUFF,
THOS. B. HUYCK.